United States Patent
Sanzone et al.

(10) Patent No.: US 12,304,653 B2
(45) Date of Patent: May 20, 2025

(54) AIRCRAFT TOUCH-AND-GO DETECTION

(71) Applicant: THE BOEING COMPANY, Chicago, IL (US)

(72) Inventors: Andrea Sanzone, Frankfurt (DE); Rahul Ashok, Singapore (SG); Rowena Loh, Singapore (SG)

(73) Assignee: THE BOEING COMPANY, Arlington, VA (US)

( * ) Notice: Subject to any disclaimer, the term of this patent is extended or adjusted under 35 U.S.C. 154(b) by 197 days.

(21) Appl. No.: 17/805,294

(22) Filed: Jun. 3, 2022

(65) Prior Publication Data
US 2023/0391471 A1 Dec. 7, 2023

(51) Int. Cl.
*G08G 5/02* (2006.01)
*B64D 45/04* (2006.01)
*G05D 1/00* (2006.01)

(52) U.S. Cl.
CPC ........... *B64D 45/04* (2013.01); *G05D 1/0676* (2013.01); *G08G 5/025* (2013.01)

(58) Field of Classification Search
CPC ......... B64D 45/04; G08G 5/025; G08G 5/065
See application file for complete search history.

(56) References Cited

U.S. PATENT DOCUMENTS

| | | | | |
|---|---|---|---|---|
| 5,189,425 A * | 2/1993 | Dabbs | ...................... | H01Q 5/45 343/781 CA |
| 5,519,618 A * | 5/1996 | Kastner | .................. | G08G 5/065 701/120 |
| 5,552,987 A * | 9/1996 | Barger | ...................... | G07C 3/04 701/14 |
| 8,700,236 B1 * | 4/2014 | Berman | ................. | G07C 5/008 701/16 |
| 9,489,851 B1 * | 11/2016 | Ross | ...................... | G06F 3/0488 |
| 9,542,782 B2 | 1/2017 | Blank | | |

(Continued)

FOREIGN PATENT DOCUMENTS

EP 3007152 A1 * 4/2016 ........... G08G 5/0013

OTHER PUBLICATIONS

AERO 11, "Rejected Takeoff Studies," Aero Magazine No. 11, http://www.skybrary.eu/index.php/Rejected_Take_Off, accessed Jun. 2, 2022, 7 pages.

(Continued)

*Primary Examiner* — Dino Kujundzic
(74) *Attorney, Agent, or Firm* — Moore IP Law

(57) ABSTRACT

A method includes receiving, at one or more processors, airport runway geospatial data indicating a geospatial area associated with an airport runway and an altitude associated with the airport runway. The method also includes receiving aircraft location data associated with an aircraft. The aircraft location data indicates a position of the aircraft at different times and an altitude of the aircraft at different times. The method further includes determining whether the aircraft performed a touch-and-go operation on the airport runway based on the airport runway geospatial data and the aircraft location data. The touch-and-go operation includes the aircraft contacting the airport runway and subsequently taking off from the airport runway without stopping. The method also includes generating a notification in response to a determination that the aircraft performed the touch-and-go operation.

20 Claims, 5 Drawing Sheets

(56) References Cited

U.S. PATENT DOCUMENTS

| | | | |
|---|---|---|---|
| 11,685,546 B2 | 6/2023 | Sanzone et al. | |
| 2015/0243112 A1* | 8/2015 | Jensen | G07C 5/0808 701/33.4 |
| 2015/0331975 A1* | 11/2015 | Garnier de Labareyre | G05B 23/0243 703/8 |
| 2017/0140656 A1* | 5/2017 | Mott | G01S 19/03 |

OTHER PUBLICATIONS

Airbus, "Flight Operations Briefing Notes—Takeoff and Departure Operations—Revisiting the 'Stop or Go' Decision," https://www.smartcockpit.com/docs/Stop_and_No_Go_Decision.pdf, accessed Sep. 13, 2021, 11 pgs.

Carver, Ray, "Occurrence Investigations—You lined up on the runway at a towered airport following your full preflight inspections. As you applied full throttle, something didn't feel right," AOPA Pilot Protection, Jul. 1, 2018, 3 pgs.

2008 Cook, Leroy, "A Different Kind of Landing—touching on Touch and Goes," AOPA Aug. 5, 2008, https://www.aopa.org/news-and-media/all-news/2008/august/flight-training-magazine/a-different-kind-of-landing , 5 pgs.

Federal Aviation Administration, "Takeoff Safety Training Guide—Section 2—Pilot Guide to Takeoff Safety," https://www.faa.gov/other_visit/aviation_industry/airline_operators/training/media/takeoff_safety.pdf. accessed Sep. 13, 2021, 45 pgs.

Johnson, Matthew, "What is a Touch and Go?", California Aeronautical University, https://calaero.edu/what-is-a-touch-and-go/, accessed Jun. 2, 2022, 8 pgs.

Martin, Swayne, "How to Fly a Touch-And-Go Landing," Blodmethod, May 7, 2022, https://www.boldmethod.com/learn-to-fly/maneuvers/touch-and-go-landing-how-to-fly/, 9 pgs.

Pilot Teacher, "Airplane Touch & Go's—Why Do Pilot's Do Them?", https://pilotteacher.com/airplane-touch-gos-this-is-why-planes-or-pilots-do-them/, accessed Jun. 2, 2022, 10 pgs.

Skybrary Aviation Safety, "Rejected Take Off," http://www.skybrary.eu/index.php/Rejected_Take_Off, accessed Sep. 13, 2021, 9 pgs.

Skybrary, "Rejected Take Off: ATC Consideration," https://www.skybrary.aero/index.php/Rejected_Take_Off:_ATC_Considerations, accessed Sep. 13, 2021, 5 pgs.

Wikipedia, "Touch-and-go landing," https://en.wikipedia.org/wiki/Touch-and-go_landing , accessed Jun. 2, 2022, 3 pgs.

\* cited by examiner

AIRCRAFT TOUCH-AND-GO DETECTION

FIELD OF THE DISCLOSURE

The subject disclosure is generally related to detecting aircraft touch-and-go operations.

BACKGROUND

Typically, when an aircraft lands on a runway, the speed of the aircraft rapidly decreases to enable the aircraft to come to a complete stop before exiting the runway. However, in some scenarios, the aircraft's speed may hinder the aircraft from coming to a complete stop before exiting the runway. For example, in some scenarios, the speed of the aircraft can be too high when the aircraft initially touches ground to enable the aircraft to come to a complete stop prior to exiting the runway. In these scenarios, the aircraft can perform a touch-and-go operation as a safety precaution. As used herein, a touch-and-go operation occurs when the aircraft lands and departs on the runway without stopping or exiting the runway. Thus, if a pilot determines that the aircraft has landed and there is not enough space to come to a complete stop, but there is enough space to accelerate and take off again, the pilot can perform a touch-and-go operation.

Pilots typically perform touch-and-go operations during pilot training. However, as described above, touch-and-go operations can be performed by pilots in other situations where a landing has to be aborted at the last minute. Logging and tracking touch-and-go operations can enable aircraft technicians to identify and perform maintenance functions on aircraft. For example, an aircraft that has performed multiple touch-and-go operations may need to undergo maintenance, such as brake maintenance, speedometer adjustment, etc. In some scenarios, a pilot can perform touch-and-go operations as a training technique. Thus, in these scenarios, logging and tracking touch-and-go operations can also be used to improve pilot trainings.

SUMMARY

In a particular implementation, a device includes a memory and one or more processors coupled to the memory. The one or more processors are configured to receive airport runway geospatial data indicating a geospatial area associated with an airport runway and an altitude associated with the airport runway. The one are more processors are also configured to receive aircraft location data associated with an aircraft. The aircraft location data indicates a position of the aircraft at different times and an altitude of the aircraft at different times. The one or more processors are further configured to determine whether the aircraft performed a touch-and-go operation on the airport runway based on the airport runway geospatial data and the aircraft location data. The touch-and-go operation includes the aircraft contacting the airport runway and subsequently taking off from the airport runway without stopping. The one or more processors are also configured to generate a notification in response to a determination that the aircraft performed the touch-and-go operation.

In another particular implementation, a method includes receiving, at one or more processors, airport runway geospatial data indicating a geospatial area associated with an airport runway and an altitude associated with the airport runway. The method also includes receiving aircraft location data associated with an aircraft. The aircraft location data indicates a position of the aircraft at different times and an altitude of the aircraft at different times. The method further includes determining whether the aircraft performed a touch-and-go operation on the airport runway based on the airport runway geospatial data and the aircraft location data. The touch-and-go operation includes the aircraft contacting the airport runway and subsequently taking off from the airport runway without stopping. The method also includes generating a notification in response to a determination that the aircraft performed the touch-and-go operation.

In another particular implementation, a non-transitory computer-readable medium includes instructions that, when executed by one or more processors, cause the one or more processors to receive airport runway geospatial data indicating a geospatial area associated with an airport runway and an altitude associated with the airport runway. The instructions, when executed by the one or more processors, further cause the one or more processors to receive aircraft location data associated with an aircraft. The aircraft location data indicates a position of the aircraft at different times and an altitude of the aircraft at different times. The instructions, when executed by the one or more processors, also cause the one or more processors to determine whether the aircraft performed a touch-and-go operation on the airport runway based on the airport runway geospatial data and the aircraft location data. The touch-and-go operation includes the aircraft contacting the airport runway and subsequently taking off from the airport runway without stopping. The instructions, when executed by the one or more processors, further cause the one or more processors to generate a notification in response to a determination that the aircraft performed the touch-and-go operation.

The features, functions, and advantages described herein can be achieved independently in various implementations or can be combined in yet other implementations, further details of which can be found with reference to the following description and drawings.

DETAILED DESCRIPTION

Figure 1:
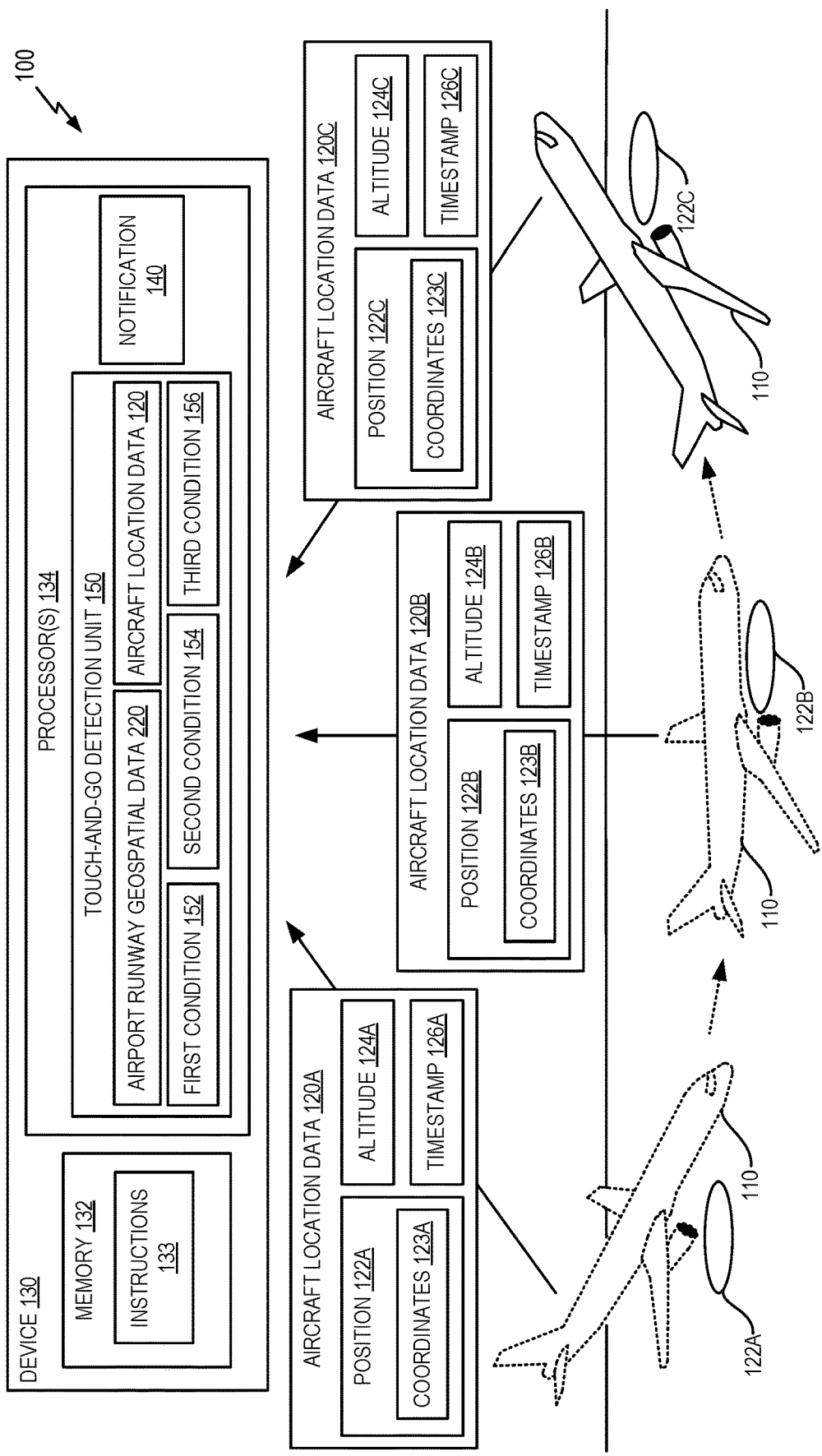
FIG. 1 is a diagram that illustrates an example of an aircraft performing a touch-and-go operation.

Aspects disclosed herein present example systems and methods for determining whether an aircraft performed a touch-and-go operation on an airport runway. As used herein, a touch-and-go operation occurs when the aircraft lands and departs on the runway without stopping or exiting the runway. To determine whether an aircraft performed a touch-and-go operation, a device (e.g., an airport controller) can receive airport runway geospatial data descriptive of a geospatial area of an airport runway. For example, the airport runway geospatial data can indicate coordinates that set boundaries for the airport runway and can indicate an altitude of the airport runway. Additionally, the device can receive aircraft location data from an aircraft as the aircraft approaches the runway. For example, as the aircraft approaches the runway (e.g., prepares to land on the runway), the aircraft can communicate its position and altitude to the device at different times. In some scenarios, the position of the aircraft can be determined using Automatic Dependent Surveillance-Broadcast (ADS-B). Based on the airport runway geospatial data and the aircraft location data from the aircraft, the device can determine whether the aircraft performed a touch-and-go operation on the airport runway.

To illustrate, the airport runway geospatial data and the aircraft location data can be used by the device to determine whether three conditions are satisfied. If the device determines that the three conditions are sequentially satisfied while the aircraft is continuously in motion within boundaries of the airport runway, the device can determine that the aircraft performed a touch-and-go operation. The first condition can correspond to a determination of whether the aircraft is airborne while the altitude of the aircraft is decreasing, the second condition can correspond to a determination of whether the aircraft is in contact with the runway, and the third condition can correspond to a determination of whether the aircraft is airborne while the altitude of the aircraft is increasing. In response to determining that the three conditions are sequentially satisfied, the device can determine that the aircraft performed a touch-and-go operation on the airport runway. Once the device determines that the aircraft performed a touch-and-go operation, the device can generate a database entry or schedule maintenance for the aircraft based on a count of detected touch-and-go operations associated with the aircraft.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple instances of aircraft location data are illustrated and associated with reference numbers 120A, 120B, 120C, etc. When referring to a particular instance of aircraft location data, such as the aircraft location data 120A, the distinguishing letter "A" is used. However, when referring to any arbitrary instance of aircraft location data or to the aircraft location data as a group, the reference number 120 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 130 with one or more processors ("processor(s)" 134 in FIG. 1), which indicates that in some implementations the device 130 includes a single processor 134 and in other implementations the device 130 includes multiple processors 134. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts a diagram that illustrates an example 100 of an aircraft performing a touch-and-go operation. In particular, in the example 100 of FIG. 1, an aircraft 110 lands and departs on an airport runway 102 without stopping or exiting the airport runway 102.

In FIG. 1, a device 130 can be configured to determine whether the aircraft 110 performed a touch-and-go operation based on data (e.g., aircraft location data 120) transmitted from the aircraft 110 to the device 130. The device 130 includes a memory 132 coupled to one or more processors 134. The memory 132 can be a non-transitory computer-readable medium that stores instructions 133 that are executable to perform the operations described herein. Namely, the instructions 133 are executable by the one or more processors 134 to determine whether the aircraft 110 performed a touch-and-go operation on the airport runway 102. According to one implementation, the device 130 can be integrated into an aircraft monitoring system, such as a device or system used by an air traffic controller.

The device 130 can be configured to receive airport runway geospatial data 220 associated with the airport runway 102. As described in greater detail with respect to FIG. 2, the airport runway geospatial data 220 can indicate a geospatial area 222 associated with the airport runway 102 and an altitude 224 associated with the airport runway 102. The geospatial area 222 can indicate a set of coordinates (e.g., longitude and latitude coordinates) that defines a boundary or perimeter of the airport runway 102. The altitude 224 can indicate a vertical elevation of the airport runway 102 with respect to a reference elevation (e.g., sea level). Based on the airport runway geospatial data 220, the device 130 can identify a location of the airport runway 102.

The aircraft 110 can be configured to communicate aircraft location data 120 to a device 130 at different times. According to the example 100 of FIG. 1, the aircraft 110 can send aircraft location data 120A to the device 130 at a first time instance, send aircraft location data 120B to the device 130 at a second time instance after the first time instance, and send aircraft location data 120C to the device 130 at a third time instance after the second time instance. The aircraft location data 120 can be periodically sent to the device 130. As a non-limiting example, the aircraft 110 can send the aircraft location data 120 to the device 130 at a periodic time interval (e.g., once every second, once every five seconds, once every ten seconds, etc.). Thus, although the aircraft 110 is illustrated in FIG. 1 as sending the aircraft location data 120 at three different instances, it should be understood that the aircraft 110 can send the aircraft location data 120 at a different number of instances based on the periodic time interval. The device 130 can be configured to receive the aircraft location data 120 from the aircraft 110.

As illustrated in FIG. 1, the aircraft 110 sends the aircraft location data 120A to the device 130 when the aircraft 110 is at a position 122A. The aircraft location data 120A indicates the position 122A of the aircraft 110. In particular, the aircraft location data 120A indicates coordinates 123A (e.g., longitude and latitude coordinates) of the aircraft 110 at the time, as indicated by a timestamp 126A, the aircraft location data 120A is sent. The aircraft location data 120A also indicates an altitude 124A of aircraft 110 at the time the aircraft location data 120A is sent. As illustrated in FIG. 1, the aircraft 110 sends the aircraft location data 120B to the device 130 when the aircraft 110 is at a position 122B. The aircraft location data 120B indicates the position 122B of the aircraft 110. In particular, the aircraft location data 120B indicates coordinates 123B (e.g., longitude and latitude coordinates) of the aircraft 110 at the time, as indicated by a timestamp 126B, the aircraft location data 120B is sent. The aircraft location data 120B also indicates an altitude 124B of aircraft 110 at the time the aircraft location data 120B is sent. As illustrated in FIG. 1, the aircraft 110 sends the aircraft location data 120C to the device 130 when the aircraft 110 is at a position 122C. The aircraft location data 120C indicates the position 122C of the aircraft 110. In particular, the aircraft location data 120C indicates coordinates 123C (e.g., longitude and latitude coordinates) of the aircraft 110 at the time, as indicated by a timestamp 126C, the aircraft location data 120C is sent. The aircraft location data 120C also indicates an altitude 124C of aircraft 110 at the time the aircraft location data 120C is sent.

The processor 134 includes a touch-and-go detection unit 150 that is configured to determine whether the aircraft 110 performed a touch-and-go operation on the airport runway 102 based on the airport runway geospatial data 220 and the aircraft location data 120. To determine whether the aircraft 110 performed a touch-and-go operation, the touch-and-go detection unit 150 can identify a time window when the aircraft is continuously in motion and located over the geospatial area 222 associated with the airport runway 102. For example, based on the received aircraft location data 120, the touch-and-go detection unit 150 can monitor the position 122 of the aircraft 110 to determine whether the position 122 of the aircraft 110 is continuously changing and determine whether coordinates 123 associated with the position 122 of the aircraft 110 are bounded by the coordinates associated with the geospatial area 222. During the identified time window, the touch-and-go detection unit 150 can determine that the aircraft 110 performed a touch-and-go operation based on the satisfaction of three conditions 152, 154, 156.

To determine whether a first condition 152 is satisfied during the identified time window, the touch-and-go detection unit 150 can determine if there is a first time period when the aircraft 110 is airborne and the altitude of the aircraft 110 is decreasing. The first condition 152 is satisfied if the first time period exists within the identified time window. To determine that the first condition 152 is satisfied, the touch-and-go detection unit 150 can be configured to determine that the altitude 124A of the aircraft 110 at particular coordinates 123A associated with the position 122A of the aircraft 110 is greater than the altitude 224 of the airport runway 102 at the particular coordinates 123A associated with the position 122A of the aircraft 110. Additionally, to determine that the first condition 152 is satisfied, the touch-and-go detection unit 150 can be configured to determine that the altitude 124A of the aircraft 110 is decreasing. If the first condition 152 is not satisfied, the touch-and-go detection unit 150 can determine that the aircraft 110 did not perform a touch-and-go operation. However, if the first condition 152 is satisfied, the touch-and-go detection unit 150 can determine if a second condition 154 is satisfied.

To determine whether the second condition 154 is satisfied during the identified time window, the touch-and-go detection unit 150 can determine if there is a second time period (following the first time period) when the aircraft 110 is in contact with the airport runway 102. The second condition 154 is satisfied if the second time period exists within the identified time window. To determine that the second condition 154 is satisfied, the touch-and-go detection unit 150 can be configured to determine that the altitude 124B of the aircraft 110 at particular coordinates 123B associated with the position 122B of the aircraft 110 is less than or equal to a threshold height above the altitude 224 of the airport runway 102 at the particular coordinates 123B associated with the position 122B of the aircraft 110. If the second condition 154 is not satisfied, the touch-and-go detection unit 150 can determine that the aircraft 110 did not perform a touch-and-go operation. However, if the second condition 154 is satisfied, the touch-and-go detection unit 150 can determine if a third condition 156 is satisfied.

To determine whether the third condition 156 is satisfied during the identified time window, the touch-and-go detection unit 150 can determine if there is a third time period (following the second time period) when the aircraft 110 is airborne and the altitude 124 of the aircraft 110 is increasing. The third condition 156 is satisfied if the third time period exists within the identified time window. To determine that the third condition 156 is satisfied, the touch-and-go detection unit 150 can be configured to determine that the altitude 124C of the aircraft 110 at particular coordinates 123C associated with the position 122C of the aircraft 110 is greater than a threshold height above the altitude 224 of the airport runway 102 at the particular coordinates 123C associated with the position 122C of the aircraft 110. To determine that the third condition 156 is satisfied, the touch-and-go detection unit 150 can be configured to determine that the altitude 124C of the aircraft 110 is increasing. If the third condition 156 is not satisfied, the touch-and-go detection unit 150 can determine that the aircraft 110 did not perform a touch-and-go operation. However, if the third condition 152 is satisfied, the touch-and-go detection unit 150 can determine that the aircraft 110 performed a touch-and-go operation.

In some scenarios, each condition 152, 154, 156 can be satisfied and the touch-and-go detection unit 150 can generate a false positive. For example, if the aircraft 110 lands on the airport runway 102 and, during the landing, bounces above a threshold height, the touch-and-go detection unit 150 can incorrectly determine that the aircraft performed a touch-and-go operation. To circumvent these scenarios, the touch-and-go detection unit 150 can optionally determine whether a fourth condition (not shown) is satisfied during the identified time window. To determine whether the fourth condition is satisfied during the identified time window, the touch-and-go detection unit 150 can determine if there is a fourth time period (following the third time period) when the aircraft 110 departs from the geospatial area 222 associated with the airport runway 102 while increasing altitude 124 and speed. The fourth condition is satisfied if the fourth time period exists within the identified time window.

In some scenarios, other aircraft sensors can be used to verify or determine whether the aircraft 110 performed a touch-and-go operation. As a non-limiting example, a sensor can be used to determine the amount of force applied to a wheel of the aircraft 110 at different times (or determine the amount of weight on the wheel of the aircraft 110 at different times). To illustrate, the processor 134 can verify that the first condition 152 is satisfied if the amount of force applied to the wheel of the aircraft 110 is below a first particular threshold (e.g., is relatively low) during the first time period. For example, prior to the aircraft 110 touching the ground, the amount of weight on the wheel of the aircraft 110 is relatively low. The processor 134 can also verify whether the second condition 154 is satisfied if the amount of force applied to the wheel of the aircraft 110 exceeds a second particular threshold (e.g., is relatively high) during the second time period. For example, when the aircraft 110 is touching the ground, the amount of weight on the wheel of the aircraft 110 is relatively high. The processor 134 can also verify whether the third condition is satisfied if the amount of force applied to the wheel of the aircraft 110 is below the first particular threshold during the third time period. For example, after the aircraft 110 takes off, the amount of weight on the wheel of the aircraft 110 is relatively low.

The processor 134 can be configured to generate a notification 140 in response to a determination that the aircraft 110 performed a touch-and-go operation. In some scenarios, the processor 134 can be configured to generate a database entry indicating that the aircraft 110 performed a touch-and-go operation in response to a determination that the aircraft 110 performed the touch-and-go operation. In some scenarios, the processor 134 can be configured to schedule maintenance for the aircraft 110 based on a count of detected touch-and-go operations in response to a determination that the aircraft 110 performed the touch-and-go operation. For example, if the aircraft 110 performed over a threshold number of touch-and-go operations, maintenance can be scheduled to verify that the landing components of the aircraft 110 are properly functioning.

The techniques described with respect to FIG. 1 enable the device 130 to detect and log touch-and-go operations performed by aircraft. As a result, the device 130 can track a count of touch-and-go operations performed by specific aircraft or performed on specific airport runways. Based on the count, the device 130 can initiate preventative actions. For example, if a threshold number of touch-and-go operations are performed on the airport runway 102, the device 130 can initiate an action to inspect the airport runway 102. If a threshold number of touch-and-go operations are performed by a particular aircraft 110, the device 130 can schedule maintenance to verify that the landing components of the aircraft 110 are properly functioning.

Figure 2:
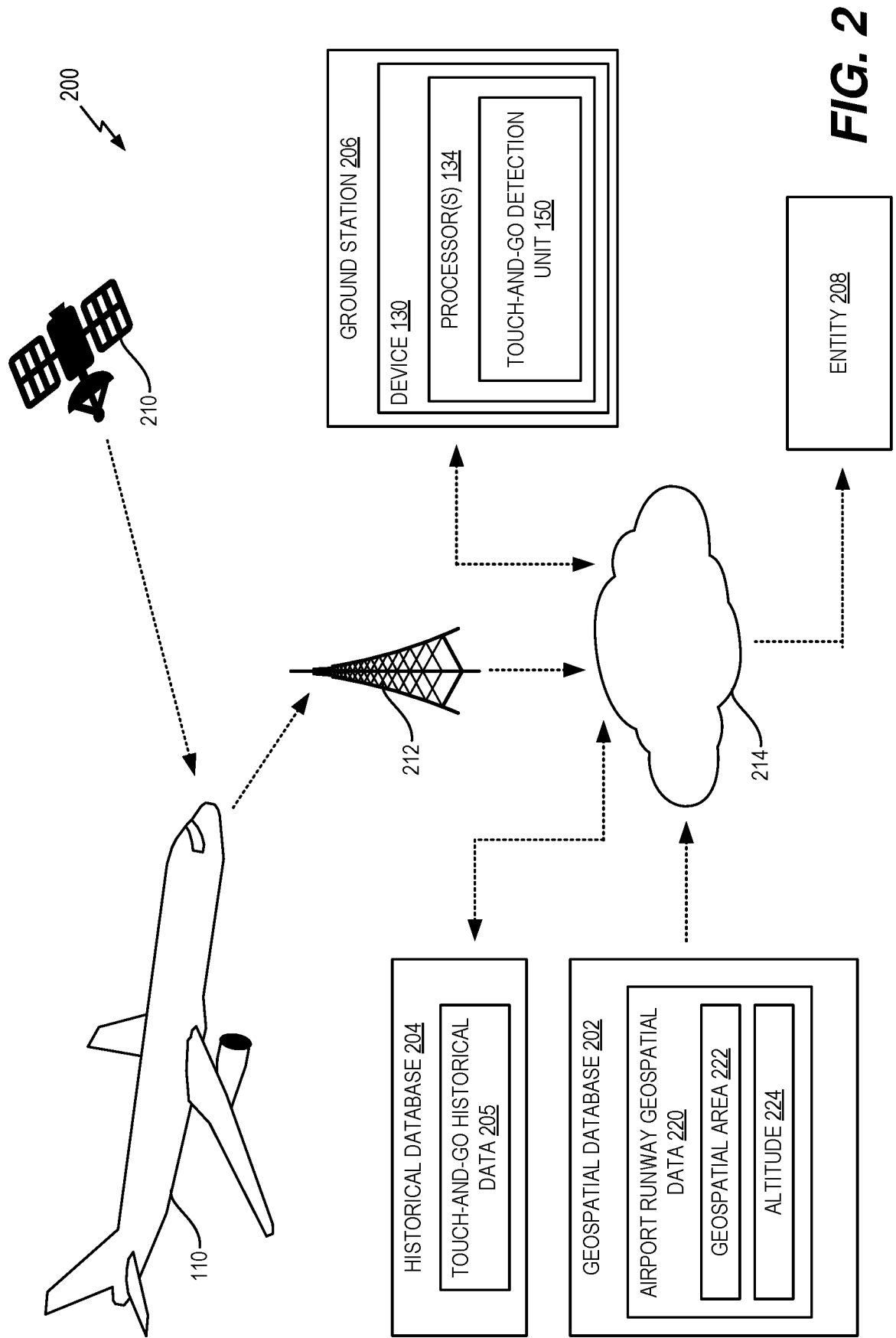
FIG. 2 is a diagram that illustrates an environment for detecting and logging a touch-and-go operation performed by an aircraft.

FIG. 2 is a diagram that illustrates an environment 200 for detecting and logging a touch-and-go operation performed by an aircraft. The environment 200 includes the aircraft 110, a geospatial database 202, a historical database 204, a ground station 206, an entity 208, one or more Global Positioning System (GPS) satellites 210, a communication tower 212, and a wireless network 214.

The ground station 206 includes the device 130. According to one implementation, the ground station 206 can correspond to an air traffic control center. As illustrated in FIG. 2, the processor 134 is integrated into the device 130, and the touch-and-go detection unit 150 is included in the processor 134. The ground station 206 can communicate with the geospatial database 202, the historical database 204, the entity 208, and the communication tower 212 via the wireless network 214.

The geospatial database 202 can include airport runway information for one or more airports. For example, the geospatial database 202 can be configured to store the airport runway geospatial data 220 associated with the airport runway 102. As described above, the airport runway geospatial data 220 can indicate the geospatial area 222 associated with the airport runway 102 and the altitude 224 of the airport runway 102. The airport runway geospatial data 220 can be provided to the ground station 206 (e.g., the device 130) via the wireless network 214.

A GPS receiver (not shown) on the aircraft 110 can determine the aircraft location data 120 based on GPS signals from the one or more GPS satellites. The aircraft 110 can be configured to send the aircraft location data 120 to the device 130 via the communication tower 212 and the wireless network 214.

The historical database 204 can be configured to store touch-and-go historical data 205. According to one implementation, the touch-and-go historical data 205 can indicate a count of touch-and-go operations the aircraft 110 has performed on the airport runway 102. According to one implementation, the touch-and-go historical data 205 can indicate a count of touch-and-go operations the aircraft 110 has performed in total (e.g., on any airport runway). According to one implementation, the touch-and-go historical data 205 can indicate a total count of touch-and-go operations performed on the airport runway 102. Thus, the touch-and-go historical data 205 can store a variety of information associated with touch-and-go operations performed by aircraft on different airport runways. The device 130 can access the historical database 204 via the wireless network 214. To illustrate, in response to a determination that the aircraft 110 performed a touch-and-go operation, the device 130 can access, via the wireless network 214, the historical database 204 to update the touch-and-go historical data 205. Alternatively, or in addition, the device 130 can access the touch-and-go historical data 205 to determine whether to schedule maintenance for the aircraft 110 based on a count of touch-and-go operations performed by the aircraft 110.

In response to detection of a touch-and-go operation, the device 130 can generate the notification 140 and send the notification to the entity 208 via the wireless network 214. According to one implementation, the entity 208 can correspond to a computing device accessible to a maintenance crew. Thus, the device 130 can notify the maintenance crew to perform maintenance operations on the aircraft 110 by sending the notification 140 to the entity 208.

Figure 3:
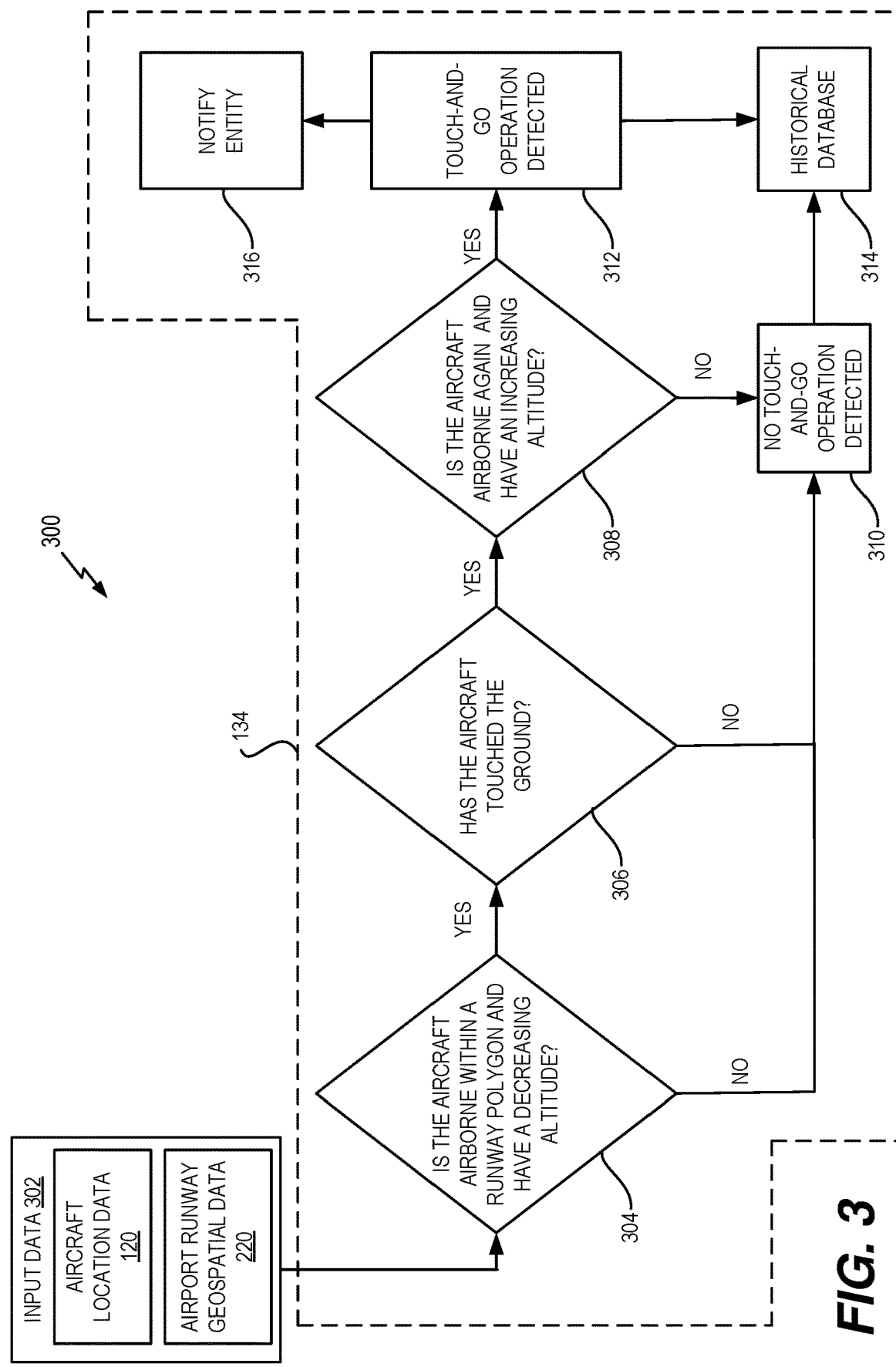
FIG. 3 is a flowchart of an example of a method for detecting a touch-and-go operation performed by an aircraft.

FIG. 3 is a flowchart of an example of a method 300 for detecting a touch-and-go operation performed by an aircraft. In a particular aspect, one or more operations of the method 300 are performed by the device 130.

According to the method 300, input data 302 can be provided to the processor 134. The input data 302 includes the aircraft location data 120 and the airport runway geospatial data 220. Based on the input data, at decision block 304, the processor 134 determines whether the aircraft 110 is airborne within a runway polygon and whether the aircraft 110 has a decreasing altitude. For example, the processor 134 (e.g., the touch-and-go detection unit 150) can determine whether the first condition 152 is satisfied. The first condition 152 is satisfied if the aircraft is airborne over the airport runway 102 (e.g., within the runway polygon) and the altitude of the aircraft 110 is decreasing. If the processor 134 determines that the first condition 152 is not satisfied, at decision block 304, the processor 134 can determine that the aircraft 110 did not perform a touch-and-go-operation, at block 310. However, if the processor 134 determines that the first condition 152 is satisfied, at decision block 304, the processor 134 can move to decision block 306.

At decision block 306, the processor 134 can determine whether the aircraft 110 has touched the ground. For example, the processor 134 (e.g., the touch-and-go detection unit 150) can determine whether the second condition 154 is satisfied. The second condition 154 is satisfied if the aircraft 110 is touching airport runway 102. If the processor 134 determines that the second condition 154 is not satisfied, at decision block 306, the processor 134 can determine that the aircraft 110 did not perform a touch-and-go-operation, at block 310. However, if the processor 134 determines that the second condition 154 is satisfied, at decision block 306, the processor 134 can move to decision block 308.

At decision block 308, the processor 134 can determine whether the aircraft 110 is airborne again and whether the aircraft 110 has an increasing altitude. For example, the processor 134 (e.g., the touch-and-go detection unit 150) can determine whether the third condition 156 is satisfied. The third condition 156 is satisfied if the aircraft 110 is airborne and the altitude of the aircraft 110 is increasing. If the processor 134 determines that the third condition 156 is not satisfied, at decision block 308, the processor 134 can determine that the aircraft 110 did not perform a touch-and-go-operation, at block 310. However, if the processor 136 determines that the third condition 156 is satisfied, at decision block 308, a touch-and-go operation is detected, at block 312. In response to detecting the touch-and-go operation, the processor 134 can update the historical database 204, at block 314, and send the notification 140 to the entity 208, at block 316.

The method 300 of FIG. 3 enables the processor 134 to detect and log touch-and-go operations performed by aircraft. As a result, the processor 134 can track a count of touch-and-go operations performed by specific aircraft or performed on specific airport runways. Based on the count, the processor 134 can initiate preventative actions. For example, if a threshold number of touch-and-go operations are performed on the airport runway 102, the device 130 can initiate an action to inspect the airport runway 102. If a threshold number of touch-and-go operations are performed by a particular aircraft 110, the device 130 can schedule maintenance to verify that the landing components of the aircraft 110 are properly functioning.

Figure 4:
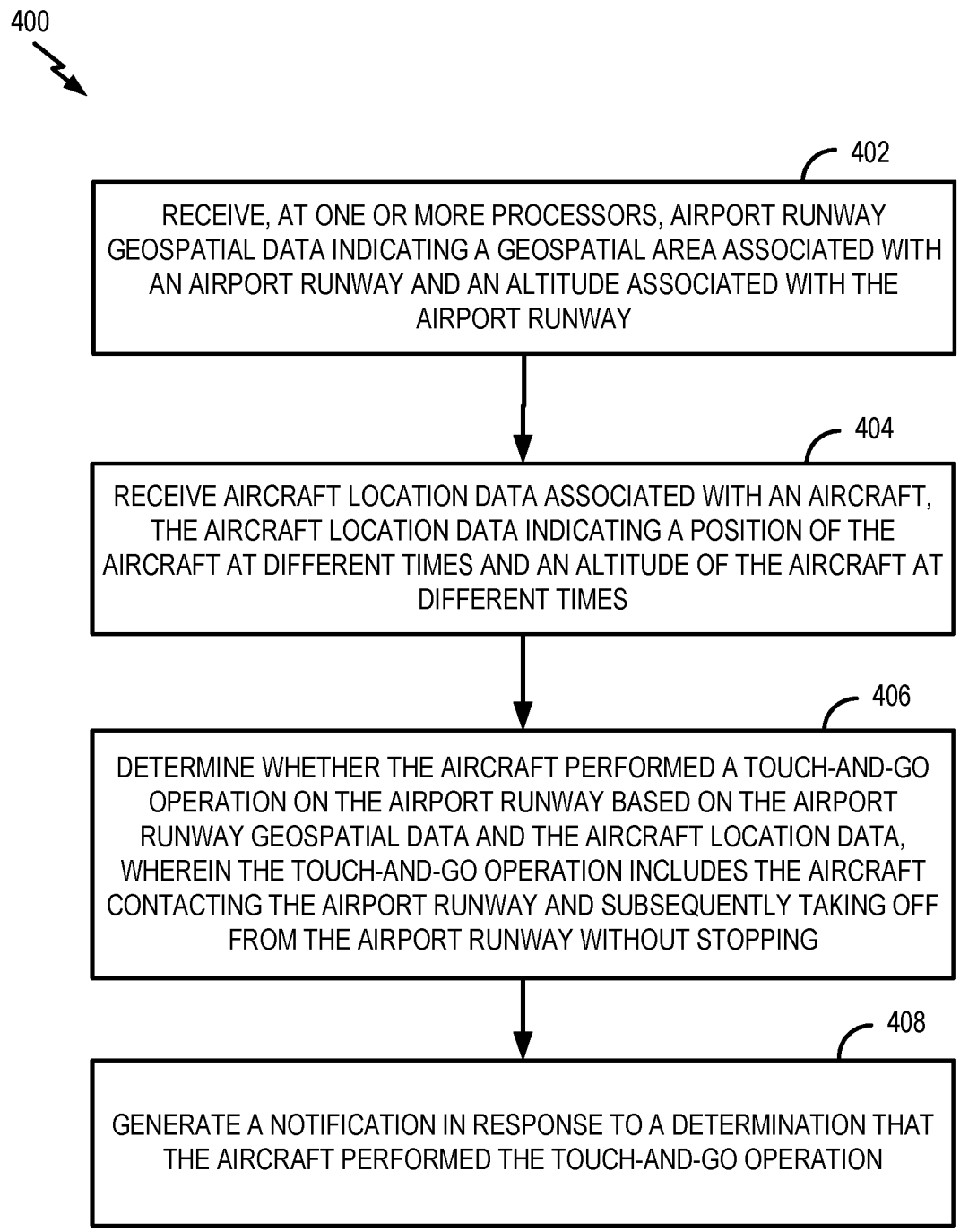
FIG. 4 is a flowchart of another example of a method for detecting a touch-and-go operation performed by an aircraft.

Referring to FIG. 4, a method of detecting a touch-and-go operation performed by an aircraft is shown and generally designated method 400. In a particular aspect, one or more operations of the method 400 are performed by the device 130.

The method 400 includes receiving, at one or more processors, airport runway geospatial data indicating a geospatial area associated with an airport runway and an altitude associated with the airport runway, at block 402. For example, referring to FIGS. 1-2, the processor 134 can receive the airport runway geospatial data 220 from the geospatial database 202. The airport runway geospatial data indicates the geospatial area 222 associated with the airport runway 102 and the altitude 224 associated with the airport runway 102.

The method 400 also includes receiving aircraft location data associated with an aircraft, at block 404. The aircraft location data indicates a position of the aircraft at different times and an altitude of the aircraft at different times. For example, referring to FIGS. 1-2, the processor 134 can receive the aircraft location data 120 via the wireless network 214 and the communication tower 212. The aircraft location data 120 indicates the position 122 of the aircraft 110 at different times and the altitude 124 of the aircraft 110 at different times.

The method 400 also includes determining whether the aircraft performed a touch-and-go operation on the airport runway based on the airport runway geospatial data and the aircraft location data, at block 406. The touch-and-go operation includes the aircraft contacting the airport runway and subsequently taking off from the airport runway without stopping. For example, referring to FIGS. 1-2, the processor 134 can determine whether the aircraft 110 performed a touch-and-go operation on the airport runway 102 based on the airport runway geospatial data 220 and the aircraft location data 120.

According to one implementation, to determine whether the aircraft performed the touch-and-go operation, the method 400 includes identifying a time window when the aircraft 110 is continuously in motion and located over the geospatial area 222 associated with the airport runway 102. To identify the time window when the aircraft 110 is continuously in motion and located over the geospatial area 222 associated with the airport runway 102, the method 400 can include determining whether the position 122 of the aircraft 110 is continuously changing and determining whether coordinates 123 associated with the position 122 of the aircraft 110 are bounded by coordinates associated with the geospatial area 222.

According to one implementation, to determine whether the aircraft performed the touch-and-go operation, the method 400 includes, during the time window, determining whether the first condition 152 is satisfied. The first condition 152 is satisfied if there is a first time period when the aircraft 110 is airborne and the altitude 124 of the aircraft 110 is decreasing. To determine that the first condition 152 is satisfied, the method 400 can include determining that the altitude 124A of the aircraft 110 at particular coordinates 123A associated with the position 122A of the aircraft 110 is greater than the altitude 224 of the airport runway 102 at the particular coordinates 123A associated with the position of the aircraft 110 and determining that the altitude 124A of the aircraft 110 is decreasing.

According to one implementation, to determine whether the aircraft performed the touch-and-go operation, the method 400 includes, during the time window, determining whether the second condition 154 is satisfied. The second condition 154 is satisfied if there is a second time period when the aircraft 110 is in contact with the airport runway 102. To determine that the second condition 154 is satisfied, the method 400 can include determining that the altitude 124B of the aircraft 110 at particular coordinates 123B associated with the position 122B of the aircraft 110 is less than or equal to a threshold height above the altitude 224 of the airport runway 102 at the particular coordinates 123B associated with position 122B of the aircraft 110.

According to one implementation, to determine whether the aircraft performed the touch-and-go operation, the method 400 includes, during the time window, determining whether the third condition 156 is satisfied. The third condition 156 is satisfied if there is a third time period when the aircraft 110 is airborne and the altitude 124C of the aircraft 110 is increasing. To determine that the third condition 156 is satisfied, the method 400 can include determining that the altitude 124C of the aircraft 110 at particular coordinates 123C associated with the position 122C of the aircraft 110 is greater than a threshold height above the altitude 224 of the airport runway 102 at the particular coordinates 123C associated with position 122C of the aircraft 110.

According to one implementation, the method 400 can include determining that the aircraft 110 performed the touch-and-go operation in response to a determination that, during the time window, the first condition 152, the second condition 154, and the third condition 156 are satisfied. The method 400 can include determining that the aircraft 110 failed to perform the touch-and-go operation in response to a determination that, during the time window, the second condition 154 is not satisfied or the third condition 156 is not satisfied.

The method 400 also includes generating a notification in response to a determination that the aircraft performed the touch-and-go operation, at block 408. For example, referring to FIGS. 1-2, the processor 134 can generate the notification 140 in response to a determination that the aircraft 110 performed the touch-and-go operation.

The method 400 enables the processor 134 to detect and log touch-and-go operations performed by aircraft. As a result, the processor 134 can track a count of touch-and-go operations performed by specific aircraft or performed on specific airport runways. Based on the count, the processor 134 can initiate preventative actions. For example, if a threshold number of touch-and-go operations are performed on the airport runway 102, the device 130 can initiate an action to inspect the airport runway 102. If a threshold number of touch-and-go operations are performed by a particular aircraft 110, the device 130 can schedule maintenance to verify that the landing components of the aircraft 110 are properly functioning.

Figure 5:
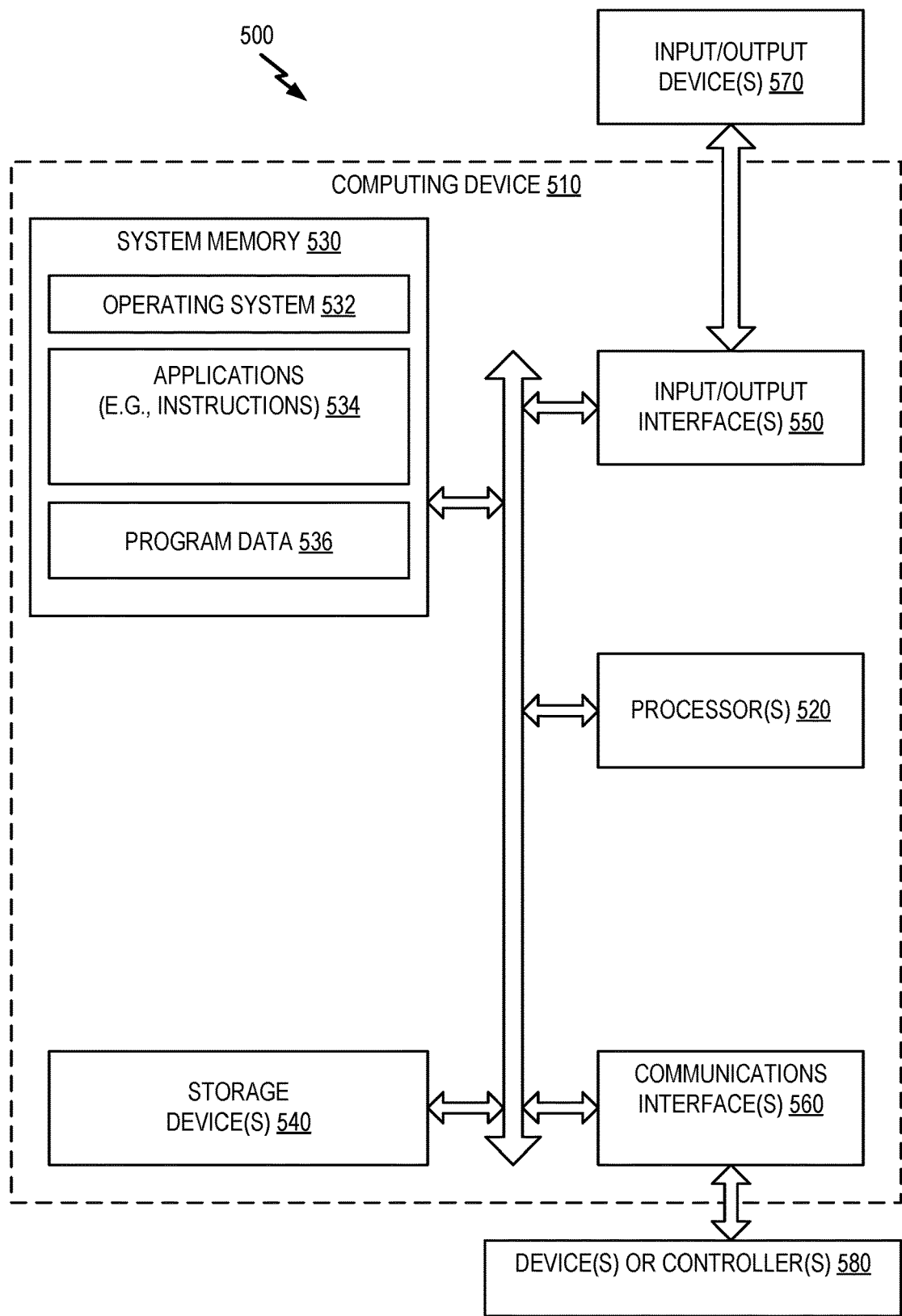
FIG. 5 is a block diagram of a computing environment including a computing device configured to support aspects of computer-implemented methods and computer-executable program instructions (or code) according to the subject disclosure.

FIG. 5 is a block diagram of a computing environment 500 including a computing device 510 configured to support aspects of computer-implemented methods and computer-executable program instructions (or code) according to the subject disclosure. For example, the computing device 510, or portions thereof, is configured to execute instructions to initiate, perform, or control one or more operations described with reference to FIGS. 1-4. According to another implementation, the computing device 510 can correspond to the device 130.

The computing device 510 includes one or more processors 520. According to one implementation, the one or more processors 520 can correspond to the processor 134 of FIG. 1. According to another implementation, the one or more processors 520 can be distinct from the processor 134 and can communicate with the processor 134 over a network. The processor(s) 520 are configured to communicate with system memory 530, one or more storage devices 540, one or more input/output interfaces 550, one or more communications interfaces 560, or any combination thereof. The system memory 530 includes volatile memory devices (e.g., random access memory (RAM) devices), nonvolatile memory devices (e.g., read-only memory (ROM) devices, programmable read-only memory, and flash memory), or both. The system memory 530 stores an operating system 532, which can include a basic input/output system for booting the computing device 510 as well as a full operating system to enable the computing device 510 to interact with users, other programs, and other devices. According to one implementation, the system memory 530 can correspond to the memory 132 of FIG. 1. For example, the system memory 530 stores system (program) data 536, such as the data indicative of the aircraft location data 120 and the airport runway geospatial data 220. According to another implementation, the system memory 530 can be distinct from the memory 132 and the system data 536 can be communicated over a network.

The system memory 530 includes one or more applications 534 (e.g., sets of instructions) executable by the processor(s) 520. As an example, the one or more applications 534 include instructions executable by the processor(s) 520 to initiate, control, or perform one or more operations described with reference to FIGS. 1-4. To illustrate, the one or more applications 534 include instructions executable by the processor(s) 520 to initiate, control, or perform one or more operations described with reference to the device 130.

In a particular implementation, the system memory 530 includes a non-transitory, computer readable medium (e.g., a computer-readable storage device) storing the instructions that, when executed by the processor(s) 520, cause the processor(s) 520 to initiate, perform, or control operations of the device 130. The operations include receiving airport runway geospatial data (e.g., the airport runway geospatial data 220) indicating a geospatial area (e.g., the geospatial area 222) associated with an airport runway (e.g., the airport runway 102) and an altitude (e.g., the altitude 224) associated with the airport runway. The operations also include receiving aircraft location data (e.g., the aircraft location data 120) associated with an aircraft (e.g., the aircraft 110). The aircraft location data indicates a position (e.g., the position 122) of the aircraft at different times and an altitude (e.g., the altitude 124) of the aircraft at different times. The operations further include determining whether the aircraft performed a touch-and-go operation on the airport runway based on the airport runway geospatial data and the aircraft location data. The touch-and-go operation includes the aircraft contacting the airport runway and subsequently taking off from the airport runway without stopping. The operations also include generating a notification (e.g., the notification 140) in response to a determination that the aircraft performed the touch-and-go operation.

The one or more storage devices 540 include nonvolatile storage devices, such as magnetic disks, optical disks, or flash (e.g. solid state) memory devices. In a particular example, the storage devices 540 include both removable and non-removable memory devices. The storage devices 540 are configured to store an operating system, images of operating systems, applications (e.g., one or more of the applications 534), and program data (e.g., the program data 536). In a particular aspect, the system memory 530, the storage devices 540, or both, include tangible computer-readable media. In a particular aspect, one or more of the storage devices 540 are external to the computing device 510.

The one or more input/output interfaces 550 enable the computing device 510 to communicate with one or more input/output devices 570 to facilitate user interaction. For example, the one or more input/output interfaces 550 can include a display interface, an input interface, or both. For example, the input/output interface 550 is adapted to receive input from a user, to receive input from another computing device, or a combination thereof. In some implementations, the input/output interface 550 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 570 includes one or more user interface devices and displays. The processor(s) 520 are configured to communicate with devices or controllers 580 via the one or more communications interfaces 560.

In some implementations, a non-transitory, computer readable medium stores instructions that, when executed by one or more processors 520, cause the one or more processors 520 to initiate, perform, or control operations to perform part or all of the functionality described above. For example, the instructions can be executable to implement one or more of the operations or methods of FIGS. 1-4. In some implementations, part or all of one or more of the operations or methods of FIGS. 1-4 can be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations can be apparent to those of skill in the art upon reviewing the disclosure. Other implementations can be utilized and derived from the disclosure, such that structural and logical substitutions and changes can be made without departing from the scope of the disclosure. For example, method operations can be performed in a different order than shown in the figures or one or more method operations can be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results can be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features can be grouped together or described in a single implementation for the purpose of streamlining the disclosure. Examples described above illustrate but do not limit the disclosure. It should also be understood that numerous modifications and variations are possible in accordance with the principles of the subject disclosure. As the following claims reflect, the claimed subject matter can be directed to less than all of the features of any of the disclosed examples. Accordingly, the scope of the disclosure is defined by the following claims and their equivalents.

Further, the disclosure comprises embodiments according to the following examples:

Example 1

A device comprising: a memory; and one or more processors coupled to the memory, the one or more processors configured to: receive airport runway geospatial data indicating a geospatial area associated with an airport runway and an altitude associated with the airport runway; receive aircraft location data associated with an aircraft, the aircraft location data indicating a position of the aircraft at different times and an altitude of the aircraft at different times; determine whether the aircraft performed a touch-and-go operation on the airport runway based on the airport runway geospatial data and the aircraft location data, wherein the touch-and-go operation includes the aircraft contacting the airport runway and subsequently taking off from the airport runway without stopping; and generate a notification in response to a determination that the aircraft performed the touch-and-go operation.

Example 2

The device of Example 1, wherein, to determine whether the aircraft performed the touch-and-go operation, the one or more processors are configured to: identify a time window when the aircraft is continuously in motion and located over the geospatial area associated with the airport runway; and during the time window: determine whether a first condition is satisfied, wherein the first condition is satisfied if there is a first time period when the aircraft is airborne and the altitude of the aircraft is decreasing; determine whether a second condition is satisfied, wherein the second condition is satisfied if there is a second time period when the aircraft is in contact with the airport runway, the second time period following the first time period; and determine whether a third condition is satisfied, wherein the third condition is satisfied if there is a third time period when the aircraft is airborne and the altitude of the aircraft is increasing, the third time period following the second time period.

Example 3

The device of any of Examples 1 to 2, wherein the one or more processors are configured to determine that the aircraft performed the touch-and-go operation in response to a determination that, during the time window, the first condition, the second condition, and the third condition are satisfied.

Example 4

The device of any of Examples 1 to 3, wherein the one or more processors are configured to determine that the aircraft failed to perform the touch-and-go operation in response to a determination that, during the time window, the second condition is not satisfied.

Example 5

The device of any of Examples 1 to 4, wherein the one or more processors are configured to determine that the aircraft failed to perform the touch-and-go operation in response to a determination that, during the time window, the third condition is not satisfied.

Example 6

The device of any of Examples 1 to 5, wherein, to identify the time window when the aircraft is continuously in motion and located over the geospatial area associated with the airport runway, the one or more processors are configured to: determine whether the position of the aircraft is continuously changing; and determine whether coordinates associated with the position of the aircraft are bounded by coordinates associated with the geospatial area.

Example 7

The device of any of Examples 1 to 6, wherein, to determine that the first condition is satisfied, the one or more processors are configured to: determine that the altitude of the aircraft at particular coordinates associated with the position of the aircraft is greater than the altitude of the airport runway at the particular coordinates associated with the position of the aircraft; and determine that the altitude of the aircraft is decreasing.

Example 8

The device of any of Examples 1 to 7, wherein, to determine that the second condition is satisfied, the one or more processors are configured to: determine that the altitude of the aircraft at particular coordinates associated with the position of the aircraft is less than or equal to a threshold height above the altitude of the airport runway at the particular coordinates associated with the position of the aircraft.

Example 9

The device of any of Examples 1 to 8, wherein, to determine that the third condition is satisfied, the one or more processors are configured to: determine that the altitude of the aircraft at particular coordinates associated with the position of the aircraft is greater than a threshold height above the altitude of the airport runway at the particular coordinates associated with the position of the aircraft; and determine that the altitude of the aircraft is increasing.

Example 10

The device of any of Examples 1 to 9, wherein the one or more processors are further configured to generate a database entry indicating that the aircraft performed the touch-and-go operation in response to a determination that the aircraft performed the touch-and-go operation.

Example 11

The device of any of Examples 1 to 10, wherein the one or more processors are further configured to schedule maintenance for the aircraft based on a count of detected touch-and-go operations in response to a determination that the aircraft performed the touch-and-go operation.

Example 12

A method comprising: receiving, at one or more processors, airport runway geospatial data indicating a geospatial area associated with an airport runway and an altitude associated with the airport runway; receiving aircraft location data associated with an aircraft, the aircraft location data indicating a position of the aircraft at different times and an altitude of the aircraft at different times; determining whether the aircraft performed a touch-and-go operation on the airport runway based on the airport runway geospatial data and the aircraft location data, wherein the touch-and-go operation includes the aircraft contacting the airport runway and subsequently taking off from the airport runway without stopping; and generating a notification in response to a determination that the aircraft performed the touch-and-go operation.

Example 13

The method of Example 12, wherein determining whether the aircraft performed the touch-and-go operation comprises: identifying a time window when the aircraft is continuously in motion and located over the geospatial area associated with the airport runway; and during the time window: determining whether a first condition is satisfied, wherein the first condition is satisfied if there is a first time period when the aircraft is airborne and the altitude of the aircraft is decreasing; determining whether a second condition is satisfied, wherein the second condition is satisfied if there is a second time period when the aircraft is in contact with the airport runway, the second time period following the first time period; and determining whether a third condition is satisfied, wherein the third condition is satisfied if there is a third time period when the aircraft is airborne and the altitude of the aircraft is increasing, the third time period following the second time period.

Example 14

The method of any of Examples 12 to 13, wherein determining whether the aircraft performed the touch-and-go operation further comprises determining whether a fourth condition is satisfied during the time window, wherein the fourth condition is satisfied if there is a fourth time period when the aircraft departs from the geospatial area associated with the airport runway while increasing altitude and speed, the fourth time period following the third time period.

Example 15

The method of any of Examples 12 to 14, further comprising determining that the aircraft performed the touch-and-go operation in response to a determination that, during the time window, the first condition, the second condition, and the third condition are satisfied.

Example 16

The method of any of Examples 12 to 15, further comprising determining that the aircraft failed to perform the touch-and-go operation in response to a determination that, during the time window, the second condition is not satisfied.

Example 17

The method of any of Examples 12 to 16, further comprising determining that the aircraft failed to perform the touch-and-go operation in response to a determination that, during the time window, the third condition is not satisfied.

Example 18

A non-transitory computer-readable medium comprising instructions that, when executed by one or more processors, cause the one or more processors to: receive airport runway geospatial data indicating a geospatial area associated with an airport runway and an altitude associated with the airport runway; receive aircraft location data associated with an aircraft, the aircraft location data indicating a position of the aircraft at different times and an altitude of the aircraft at different times; determine whether the aircraft performed a touch-and-go operation on the airport runway based on the airport runway geospatial data and the aircraft location data, wherein the touch-and-go operation includes the aircraft contacting the airport runway and subsequently taking off from the airport runway without stopping; and generate a notification in response to a determination that the aircraft performed the touch-and-go operation.

Example 19

The non-transitory computer-readable medium of Example 18, wherein, to determine whether the aircraft performed the touch-and-go operation, the instructions, when executed by the one or more processors, cause the one or more processors to: identify a time window when the aircraft is continuously in motion and located over the geospatial area associated with the airport runway; and during the time window: determine whether a first condition is satisfied, wherein the first condition is satisfied if there is a first time period when the aircraft is airborne and the altitude of the aircraft is decreasing; determine whether a second condition is satisfied, wherein the second condition is satisfied if there is a second time period when the aircraft is in contact with the airport runway, the second time period following the first time period; determine whether a third condition is satisfied, wherein the third condition is satisfied if there is a third time period when the aircraft is airborne and the altitude of the aircraft is increasing, the third time period following the second time period; and determine whether a fourth condition is satisfied, wherein the fourth condition is satisfied if there is a fourth time period when the aircraft departs from the geospatial area associated with the runway while increasing altitude and speed, the fourth time period following the third time period.

Example 20

The non-transitory computer-readable medium of any of Examples 18 to 20, wherein the instructions, when executed by the one or more processors, further cause the one or more processors to determine that the aircraft performed the touch-and-go operation in response to a determination that, during the time window, the first condition, the second condition, the third condition, and the fourth condition are satisfied.

What is claimed is:

1. A device comprising:
a memory; and
one or more processors coupled to the memory, the one or more processors configured to:
receive airport runway geospatial data indicating a geospatial area associated with an airport runway and an altitude associated with the airport runway;
receive aircraft location data associated with an aircraft, the aircraft location data indicating a position of the aircraft at different times and an altitude of the aircraft at different times;
identify a time window when the aircraft is continuously in motion and located over the geospatial area associated with the airport runway;
during the time window:
determine whether a first condition is satisfied, wherein the first condition is satisfied if there is a first time period when the aircraft is airborne and the altitude of the aircraft is decreasing;
determine whether a second condition is satisfied, wherein the second condition is satisfied if there is a second time period when the aircraft is in contact with the airport runway, the second time period following the first time period; and
determine whether a third condition is satisfied, wherein the third condition is satisfied if there is a third time period when the aircraft is airborne and the altitude of the aircraft is increasing, the third time period following the second time period;
determine whether the aircraft performed a touch-and-go operation on the airport runway based on the airport runway geospatial data and the aircraft location data, wherein the touch-and-go operation includes the aircraft contacting the airport runway and subsequently taking off from the airport runway without stopping, wherein the one or more processors are configured to determine that the aircraft failed to perform the touch-and-go operation in response to a determination that, during the time window, the third condition is not satisfied; and
generate a notification in response to a determination that the aircraft performed the touch-and-go operation.

2. The device of claim 1, wherein the one or more processors are further configured to update a historical database based on whether the aircraft performed a touch-and-go operation on the airport runway, wherein the historical database stores a count of touch-and-go operations at a plurality of airport runways for the aircraft, the plurality of airport runways including the airport runway.

3. The device of claim 2, wherein the one or more processors are further configured to schedule maintenance for the aircraft responsive to a total count of touch-and-go operations for the aircraft satisfying a threshold number.

4. The device of claim 1, wherein the one or more processors are configured to determine that the aircraft performed the touch-and-go operation in response to a determination that, during the time window, the first condition, the second condition, and the third condition are satisfied.

5. The device of claim 1, wherein the one or more processors are configured to determine that the aircraft failed to perform the touch-and-go operation in response to a determination that, during the time window, the second condition is not satisfied.

6. The device of claim 1, wherein, to identify the time window when the aircraft is continuously in motion and located over the geospatial area associated with the airport runway, the one or more processors are configured to:
  determine whether the position of the aircraft is continuously changing; and
  determine whether coordinates associated with the position of the aircraft are bound by coordinates associated with the geospatial area.

7. The device of claim 1, wherein, to determine that the first condition is satisfied, the one or more processors are configured to:
  determine that the altitude of the aircraft at particular coordinates associated with the position of the aircraft is greater than the altitude of the airport runway at the particular coordinates associated with the position of the aircraft; and
  determine that the altitude of the aircraft is decreasing.

8. The device of claim 1, wherein, to determine that the second condition is satisfied, the one or more processors are configured to:
  determine that the altitude of the aircraft at particular coordinates associated with the position of the aircraft is less than or equal to a threshold height above the altitude of the airport runway at the particular coordinates associated with the position of the aircraft.

9. The device of claim 1, wherein, to determine that the third condition is satisfied, the one or more processors are configured to:
  determine that the altitude of the aircraft at particular coordinates associated with the position of the aircraft is greater than a threshold height above the altitude of the airport runway at the particular coordinates associated with the position of the aircraft; and
  determine that the altitude of the aircraft is increasing.

10. The device of claim 1, wherein the one or more processors are further configured to generate a database entry indicating that the aircraft performed the touch-and-go operation in response to a determination that the aircraft performed the touch-and-go operation.

11. The device of claim 1, wherein the one or more processors are further configured to schedule maintenance for the aircraft based on a count of touch-and-go operations in response to a determination that the aircraft performed the touch-and-go operation.

12. A method comprising:
  receiving, at one or more processors, airport runway geospatial data indicating a geospatial area associated with an airport runway and an altitude associated with the airport runway;
  receiving aircraft location data associated with an aircraft, the aircraft location data indicating a position of the aircraft at different times and an altitude of the aircraft at different times;
  identifying a time window when the aircraft is continuously in motion and located over the geospatial area associated with the airport runway; and
  during the time window:
    determining whether a first condition is satisfied, wherein the first condition is satisfied if there is a first time period when the aircraft is airborne and the altitude of the aircraft is decreasing;
    determining whether a second condition is satisfied, wherein the second condition is satisfied if there is a second time period when the aircraft is in contact with the airport runway, the second time period following the first time period; and
    determining whether a third condition is satisfied, wherein the third condition is satisfied if there is a third time period when the aircraft is airborne and the altitude of the aircraft is increasing, the third time period following the second time period;
  determining whether the aircraft performed a touch-and-go operation on the airport runway based on the airport runway geospatial data and the aircraft location data, wherein the touch-and-go operation includes the aircraft contacting the airport runway and subsequently taking off from the airport runway without stopping, wherein the aircraft is determined to have failed to perform the touch-and-go operation in response to a determination that, during the time window, the third condition is not satisfied; and
  generating a notification in response to a determination that the aircraft performed the touch-and-go operation.

13. The method of claim 12, further comprising updating a historical database based on whether the aircraft performed a touch-and-go operation on the airport runway, wherein the historical database stores a count of touch-and-go operations at a plurality of airport runways for a plurality of aircraft, the plurality of airport runways including the airport runway.

14. The method of claim 12, further comprising determining that the aircraft performed the touch-and-go operation in response to a determination that, during the time window, the first condition, the second condition, and the third condition are satisfied.

15. The method of claim 12, further comprising determining that the aircraft failed to perform the touch-and-go operation in response to a determination that, during the time window, the second condition is not satisfied.

16. The method of claim 12, further comprising determining that the aircraft failed to perform the touch-and-go operation in response to a determination that, during the time window, the third condition is not satisfied.

17. The method of claim 12, wherein determining whether the aircraft performed the touch-and-go operation further comprises determining whether a fourth condition is satisfied during the time window, wherein the fourth condition is satisfied if there is a fourth time period when the aircraft departs from the geospatial area associated with the airport runway while increasing altitude and speed, the fourth time period following the third time period.

18. A non-transitory computer-readable medium comprising instructions that, when executed by one or more processors, cause the one or more processors to:
  receive airport runway geospatial data indicating a geospatial area associated with an airport runway and an altitude associated with the airport runway;

receive aircraft location data associated with an aircraft, the aircraft location data indicating a position of the aircraft at different times and an altitude of the aircraft at different times;

identify a time window when the aircraft is continuously in motion and located over the geospatial area associated with the airport runway; and during the time window:

determine whether a first condition is satisfied, wherein the first condition is satisfied if there is a first time period when the aircraft is airborne and the altitude of the aircraft is decreasing;

determine whether a second condition is satisfied, wherein the second condition is satisfied if there is a second time period when the aircraft is in contact with the airport runway, the second time period following the first time period;

determine whether a third condition is satisfied, wherein the third condition is satisfied if there is a third time period when the aircraft is airborne and the altitude of the aircraft is increasing, the third time period following the second time period;

determine whether the aircraft performed a touch-and-go operation on the airport runway based on the airport runway geospatial data and the aircraft location data, wherein the touch-and-go operation includes the aircraft contacting the airport runway and subsequently taking off from the airport runway without stopping, wherein the aircraft is determined to have failed to perform the touch-and-go operation in response to a determination that, during the time window, the third condition is not satisfied; and generate a notification in response to a determination that the aircraft performed the touch-and-go operation.

19. The non-transitory computer-readable medium of claim 18, wherein, to determine whether the aircraft performed the touch-and-go operation, the instructions, when executed by the one or more processors, cause the one or more processors to, during the time window, determine whether a fourth condition is satisfied, wherein the fourth condition is satisfied if there is a fourth time period when the aircraft departs from the geospatial area associated with the airport runway while increasing altitude and speed, the fourth time period following the third time period.

20. The non-transitory computer-readable medium of claim 19, wherein the instructions, when executed by the one or more processors, further cause the one or more processors to determine that the aircraft performed the touch-and-go operation in response to a determination that, during the time window, the first condition, the second condition, the third condition, and the fourth condition are satisfied.

\* \* \* \* \*